(12) United States Patent
Morovic et al.

(10) Patent No.: US 11,003,165 B2
(45) Date of Patent: May 11, 2021

(54) TRANSFORMING THREE DIMENSIONAL OBJECT DATA INTO OBJECT PROPERTY DATA OBJECTS

(71) Applicant: Hewlett-Packard Development Company, L.P., Houston, TX (US)

(72) Inventors: Jan Morovic, Colchester (GB); Peter Morovic, Sant Cugat del Valles (ES); Juan Manuel Garcia Reyero Vinas, Sant Cugat (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 313 days.

(21) Appl. No.: 15/545,691

(22) PCT Filed: Apr. 24, 2015

(86) PCT No.: PCT/EP2015/058918
§ 371 (c)(1),
(2) Date: Jul. 22, 2017

(87) PCT Pub. No.: WO2016/169614
PCT Pub. Date: Oct. 27, 2016

(65) Prior Publication Data
US 2018/0017955 A1    Jan. 18, 2018

(51) Int. Cl.
*G05B 19/4099* (2006.01)
*B33Y 50/00* (2015.01)
(Continued)

(52) U.S. Cl.
CPC ........ *G05B 19/4099* (2013.01); *B29C 64/386* (2017.08); *B33Y 50/00* (2014.12);
(Continued)

(58) Field of Classification Search
CPC .... G05B 19/4099; B33Y 50/00; B33Y 70/00; B33Y 30/00; B33Y 50/02; G06T 17/00;
(Continued)

(56) References Cited

U.S. PATENT DOCUMENTS 5,689,435 A * 11/1997 Umney ................. F01D 25/00
700/159
6,473,090 B1    10/2002 Mayer
(Continued)

FOREIGN PATENT DOCUMENTS

| CN | 102279898 | 12/2011 |
| WO | WO2012113372 | 8/2013 |

OTHER PUBLICATIONS

"Additive Manufacturing File Format", Wikipedia, Jan. 31, 2015, 7 pages, https://en.wikipedia.org/wiki/Additive_Manufacturing_File_Format.
(Continued)

*Primary Examiner* — Darrin D Dunn
(74) *Attorney, Agent, or Firm* — HP Inc. Patent Department

(57) ABSTRACT

Apparatus and methods for transforming three dimensional object data are disclosed. In some examples, data representing a three dimensional object is received, the data comprising object property data indicative of at least one attribute of at least a portion of the three dimensional object. The object property data is transformed into a plurality of device independent object property data objects having a common data structure, each object property data object comprising a value indicative of each of a predetermined set of object properties.

15 Claims, 3 Drawing Sheets

(51) Int. Cl.
  *B29C 64/386* (2017.01)
  *G06F 119/18* (2020.01)
  *G06F 30/00* (2020.01)
  *H04N 1/00* (2006.01)

(52) U.S. Cl.
  CPC ......... *G06F 30/00* (2020.01); *H04N 1/00827* (2013.01); *G05B 2219/35134* (2013.01); *G05B 2219/49023* (2013.01); *G06F 2119/18* (2020.01); *Y02P 90/02* (2015.11)

(58) Field of Classification Search
  CPC ....... G06T 15/08; B29C 64/386; B29C 64/10; B29C 64/112
  See application file for complete search history.

(56) References Cited

U.S. PATENT DOCUMENTS

| | | | | |
|---|---|---|---|---|
| 6,614,549 | B1* | 9/2003 | Hlava | G06F 3/1204 358/1.1 |
| 7,965,290 | B1* | 6/2011 | Kouznetsov | G06T 17/005 345/419 |
| 8,320,008 | B2* | 11/2012 | Jahn | G06F 3/1205 358/1.15 |
| 8,509,933 | B2* | 8/2013 | Steingart | A61C 13/0019 700/98 |
| 8,531,667 | B2 | 9/2013 | Horita | |
| 8,565,909 | B2 | 10/2013 | Bickel et al. | |
| 8,634,105 | B2* | 1/2014 | Yu | H04N 1/6058 358/1.9 |
| 9,036,209 | B2* | 5/2015 | Holub | G06F 3/1267 358/2.1 |
| 10,275,931 | B2* | 4/2019 | Morovic | G06T 15/503 |
| 2006/0031811 | A1* | 2/2006 | Ernst | G06F 16/289 717/100 |
| 2011/0222081 | A1* | 9/2011 | Yi | G06T 17/00 358/1.9 |
| 2012/0065755 | A1* | 3/2012 | Steingart | A61C 13/0019 700/98 |
| 2012/0224755 | A1* | 9/2012 | Wu | B29C 64/386 382/131 |
| 2013/0328228 | A1* | 12/2013 | Pettis | G06F 3/1224 425/145 |
| 2014/0025714 | A1* | 1/2014 | Reyntjens | G06F 16/16 707/827 |
| 2014/0031967 | A1* | 1/2014 | Unger | B29C 67/0088 700/119 |
| 2014/0277669 | A1* | 9/2014 | Nardi | G05B 19/042 700/103 |
| 2014/0312535 | A1* | 10/2014 | Dikovsky | A61C 13/0019 264/401 |
| 2014/0324204 | A1* | 10/2014 | Vidimce | B29C 67/0088 700/98 |
| 2015/0005919 | A1* | 1/2015 | McGatha | B29C 64/386 700/119 |
| 2015/0253761 | A1* | 9/2015 | Nelson | G06F 3/1238 700/98 |
| 2017/0371318 | A1* | 12/2017 | Morovic | G05B 19/4099 |
| 2018/0032060 | A1* | 2/2018 | Zeng | G06T 19/20 |
| 2018/0240263 | A1* | 8/2018 | Courter | G06T 15/08 |
| 2018/0311890 | A1* | 11/2018 | Pettis | G05B 19/4099 |
| 2019/0108675 | A1* | 4/2019 | Zeng | G06T 19/00 |

OTHER PUBLICATIONS

Doubrovski, E.L., et al. "Voxel-based fabrication through material property mapping: A design method for bitmap printing", Computer-Aided Design 60 (2015) pp. 3-13.

International Search Report and Written Opinion for International Application No. PCT/EP2015/058918 dated Jan. 25, 2016, 17 pages.

Hiller, J. D., el al "STL 2.0: A Proposal for a Universal Multi-Material Additive Manufacturing File Format", Mech. and Aerospace Eng. Cornell Univ. 2013 XP055240419 pp. 1-13.

Hiller, Jonathan, et al "Tunable Digital Material Properties for 3D Voxel Printers", Mechanical and Aerospace Engineering Cornell University, 2008, XP-002694093, pp. 33-44.

Vidimce, Kiril et al "OpenFab: A Programmable Pipeline for Multi-Material Fabrication", ACM Transactions on Graphics, vol. 32, No. 4, Article 136, Jul. 2013, XP-55237566, 11pgs.

Samanta, Kuntal, et al. "Feature-based design and material blending for free-form heterogeneous object modeling", Computer-Aided Design 37 (2005) pp. 287-305.

\* cited by examiner

TRANSFORMING THREE DIMENSIONAL OBJECT DATA INTO OBJECT PROPERTY DATA OBJECTS

BACKGROUND

Three dimensional objects generated by an additive manufacturing process may be formed in a layer-by-layer manner. In one example of additive manufacturing, an object is generated by solidifying portions of layers of build material in an apparatus. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used to solidify a build material. In other examples, three dimensional objects may be generated by using extruded plastics or sprayed materials as build materials, which solidify to form an object.

Some printing processes that generate three dimensional objects use control data generated from a model of a three dimensional object. This control data may, for example, specify the locations at which to apply an agent or combination of agents to build material, or where build material itself may be placed, and the amounts to be placed.

The control data may be generated from a representation of a three dimensional object to be printed. Such a representation may be referred to herein as a three dimensional model, and may be stored as a data file. The control data may be used by suitable print apparatus to produce an object.

BRIEF DESCRIPTION OF DRAWINGS

For a more complete understanding, reference is now made to the following description taken in conjunction with the accompanying drawings in which.

DETAILED DESCRIPTION

Figure 1:
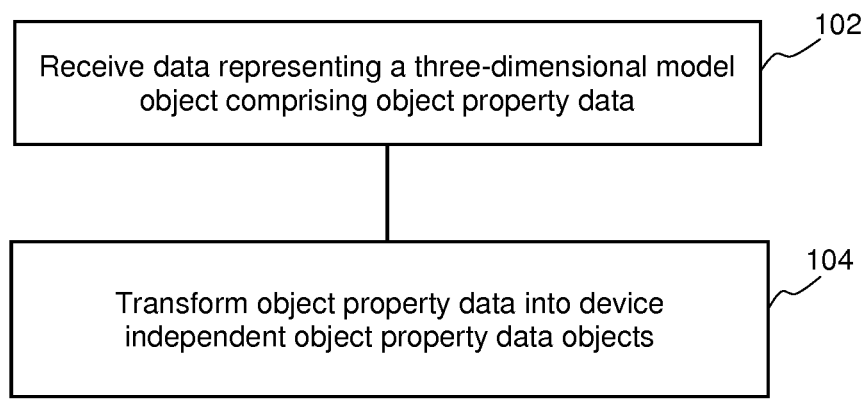
FIG. 1 is a flowchart of an example of a method comprising object property data transformation.

Some examples described herein provide an apparatus and a method for representing a three dimensional object and/or for generating control data that may be used to produce a three dimensional object. Some examples allow arbitrary three dimensional content with a variety of specified object properties to be processed and used to generate a three dimensional object. These object properties may comprise, for example, any or any combination of: conductivity, density, porosity, plasticity, hardness, ductility, strength, interlayer strength and/or appearance properties (color, transparency, glossiness, surface texture, etc).

In some examples herein, three dimensional space is characterised in terms of 'voxels', i.e. three dimensional pixels, wherein each voxel occupies a discrete volume. In data modelling a three dimensional object, a voxel at a given location may have at least one characteristic. For example, it may be empty, or may have a particular color or may represent a particular material, or a particular object property, or the like. The voxels of an object may be the same size, for example relating to a cubic or other shaped region in space, or may vary in size and/or form within an object.

In some examples, data representing a three dimensional object is processed to generate control data to be used in generating the object.

In some examples, a print material coverage specification specifies print material data, for example detailing the amount of print materials (such as agent(s) to be deposited onto a layer of build material, or in some examples, build materials themselves), and, if applicable, their combinations. In some examples, this may be specified as a proportional volume coverage (for example, X % of a region of a layer of build material should have agent Y applied thereto). Such print materials may be related to or selected to provide an object property.

The actual location at which each print material (for example, a drop of an agent) should be applied, as specified in control data, may be determined using halftoning techniques.

For example, a set of voxels within object model data may have an associated print material coverage specification in the form of a set of material volume coverage (Mvoc) vectors. In a simple case, such a vector may indicate that X % of a given region of three dimensional space should have a particular agent applied thereto, whereas (100-X) % should be left clear of agent. In other examples, material combinations may be specified. The material volume coverage vectors may then provide the input for a halftoning process to generate control data that may be used by an additive manufacturing system to produce a three dimensional object. For example, it may be determined that, to produce specified object properties, 25% of a layer of build material (or of a portion of a layer) should have an agent applied thereto. The halftoning process determines where the drops of agent fall in order to provide 25% coverage, for example by comparing each location to a threshold value provided in a halftone threshold matrix.

In some examples, data representing a three dimensional structure or object is 'rasterized', i.e. converted to series of discrete locations. The rasterized data may be at the printable resolution of the three dimensional printing apparatus to which control data may be provided.

It may be the case that, at the time the three dimensional data model is constructed, a print apparatus to be used to print the object is unspecified, at least in terms of its capabilities.

In block 102 of FIG. 1, data representing a three dimensional object is received, the data comprising object property data indicative of an attribute (for example, at least one physical attribute or property) of at least a portion of the three dimensional object. In block 104, the object property data is transformed into a plurality of device independent object property data objects having a common data structure, the data objects each comprise a value indicative of each of a predetermined set (common) of object properties held within the common data structure. As used herein, the term 'device independent' means that the data object is not formulated with a particular model generation apparatus, print apparatus, or print generation workflow in mind. Instead, it contains values representing a predetermined set of properties which can be derived from, and interpreted by, a range of devices, software packages and the like.

As the object property data object is device independent, it can be used as an intermediate representation to map data from a range of data sources (such as CAD packages, object analysis apparatus, or any other source of data representing an object) to control data for a particular print apparatus (for example according to that print apparatus' capabilities to reproduce particular properties). When an object property data object is to provide control data, use of a device independent data object means that, whatever the original data format, a mapping (for example, a lookup table or the like) from the device independent data object can be used to generate control data for a particular print apparatus. If the original object model representation was instead used, then a mapping from that specific representation type would have to be specified or determined, which may result in multiple mappings in order to support multiple object model data sources. Similarly, mapping from a particular model data source to the device independent data object may be made without knowledge of a print apparatus.

In examples, content of a data object is specified independently of the properties specified in a particular model, and/or independently of the capabilities of a print apparatus used to generate an object according to the model. Properties specified in the object property data object may therefore be the same as the properties specified in received data (but may, in some examples, be described differently), or it may comprise values relating to additional properties, and/or may contain values relating to a subset of the properties specified in or derivable from the received data. This allows the data object to be used with a wide range of data sources and to be used to generate control data for a wide range of print apparatus. When compared to, for example, specifying printer colors for two-dimensional printing, in three dimensional printing there is a wide range of possible print apparatus capabilities and of possible data specifications for model data. A device independent data object as specified herein may allow conversion between diverse sets of specified and/or achievable properties.

Figure 2:
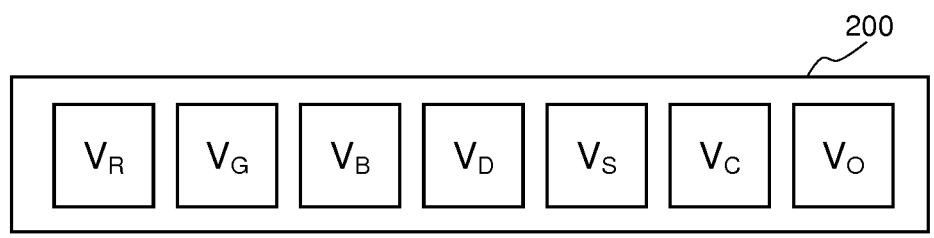
FIG. 2 is a schematic representation of an example of an object property data object.

An example of a device independent object property data object 200 is shown schematically in FIG. 2. In this example, the set of properties comprises three color values $V_R$, $V_G$, $V_B$, representing Red, Green and Blue color values, a Density value $V_D$, a stiffness value $V_S$, a conductivity value $V_C$ and an opacity value $V_O$. Other object properties which may be described in a data object may comprise any of, amongst others: flexibility; elasticity; rigidity; surface roughness; porosity; strength; ductility; plasticity or the like.

In some examples, a value set is predetermined for each property and the value is taken from the set. For example, a bit depth may be specified for each property. For the set of values shown in FIG. 2, the bit depth may for example be specified as [8, 8, 8, 5, 4, 1, 6]. In such an object, the color values are specified with 8 bit resolution, and may therefore take any value in the value set [0, 1, 2 . . . 254, 255]. 5 bits (32 level resolution) are used to specify the density values, which can therefore take any value in the value set [0, 1, 2 . . . 30, 31]. 4 bits (16 level resolution) are used to specify the stiffness values, 1 bit (on/off, or [0, 1]) for conductivity, and 6 bits (64 level resolution) for opacity. This results in a 5-byte encoding of the seven property data object.

In some examples, a value set may be defined in terms of a particular unit. For example, in the case of the RGB values, these could be identified according to device independent color definitions such as sRGB. In other examples, colors could be defined in terms of a specific ICC profile, or in terms of the International Commission on Illumination (CIE) 1931 XYZ color space, wherein three variables ('X', 'Y' and 'Z' or tristimulus values) are used to model a color; the CIE 1976 (L*, a*, b*—CIELAB or 'LAB') color space, wherein three variables represent lightness ('L') and opposing color dimensions ('a' and 'b'); or any other color space or derived color space.

For example, in a simple case, an RGB color value may comprise three 8-bit values; as such each red, green and blue value may be within the range of 0 to 255. Density values $V_D$ could be expressed in kg/m3, stiffness $V_S$ in N/m, conductivity $V_c$ in S/m, and opacity $V_O$ as a dimensionless optical density value representing a value between 0 and 1 specifying a ratio of light transmitted through a specified thickness of material to light blocked thereby. In some examples, rather than being expressed in terms of absolute values, all values of a particular property may be indicative of a position within a range. In some examples, data relating to the interpretation of at least one of the data values may be generated and/or provided with the data objects. In some examples, when a data object is used to generate control data, the range achievable by a particular print apparatus in relation to a particular property could be considered and used to determine the device dependent value within that range, i.e. a value achievable by a particular print apparatus, which best represents the device independent value. Such a device-dependent interpretation may also be used in the absence of a specification of units. Where data relating to the interpretation of at least one of the data values is provided with the data objects, this may be used in generating control data.

In some examples, default values may be defined. In examples, default values may be used wherever data property is undefined in at least a proportion of received object property data. The default values may be user specified, predetermined or derived based on received model data. Where default values are used, this enables a standardised data object to be formed even in the absence of explicitly defined values, and therefore allows a data object having a consistent data format to be generated from a diverse range of model data sources and formats. In some examples, default values may for example be midpoints in the range available, or may be predetermined according to practical or economic considerations. For example, tensile strength or stiffness could be determined in view of a practical minimum value which allows an object to be self supporting and reasonably robust, and/or bearing in mind costs. Certain defaults may specify that a property is absent (for example, as a default, conductivity, which may result in the specification of use of specialised agents, may be set to off, or 0, in a data object unless conductivity is specified in the received data representing a three dimensional object), or avoided (for example, as white can be a relatively expensive color to reproduce and the combinations of other properties which may be achieved in a white object may be restricted, a default colour may be other than white, for example a mid gray).

In some examples, value ranges corresponding to the encoding range may be specified or determined. To give a particular example, opacity could be specified such that it may vary between absolute values of 0.1 to 1.6, which may be highest value of density for a particular, or for a generic, print apparatus (for example, the range may reflect an industry standard achievable range). A maximum and/or minimum may be used in the mapping, such that, for example, all stated absolute opacity values of 0.1 or lower map to 0, which is the lowest value in the example 64 bit data value set, and those of 1.6 or higher map to 63 which is the highest value in the example 64 bit data value set. In examples, a specifically stated maximum or minimum value (and/or a specific absolute value, which may be associated with any and all of the values of a value set associated with a particular property) may be supplied with the object model data. In other examples, a range may be derived from actual values provided within the model data (e.g., the highest stated density may map to 63, and the lowest stated density may map to 0, and/or the range may be stored). In other examples, defaults for a maximum value may be predefined or user specified. Allowing specification of a range allows a property range to be encoded efficiently, while allowing for changes in achievable ranges. For example, if the interpretation of the range of values intended to be reflected by a particular encoding was fixed, this may either span a range which is too large to be fully utilized, or which fails to span the whole of an achievable range, in particular should an achievable range increase after a property has been encoded.

In some examples, the data representing the three dimensional object further comprises object model data defining the geometry of the three dimensional object. The device independent data objects may be stored in association with a physical location (which may be a volume) within the object, such that each location is accompanied with a list of properties.

The data objects may therefore comprise part of a device independent object description. As this is not defined in relation to a particular processing or print apparatus, it may be used to generate control data for or by any print apparatus with knowledge (or identification) of the data structure and print apparatus capabilities.

Figure 3:
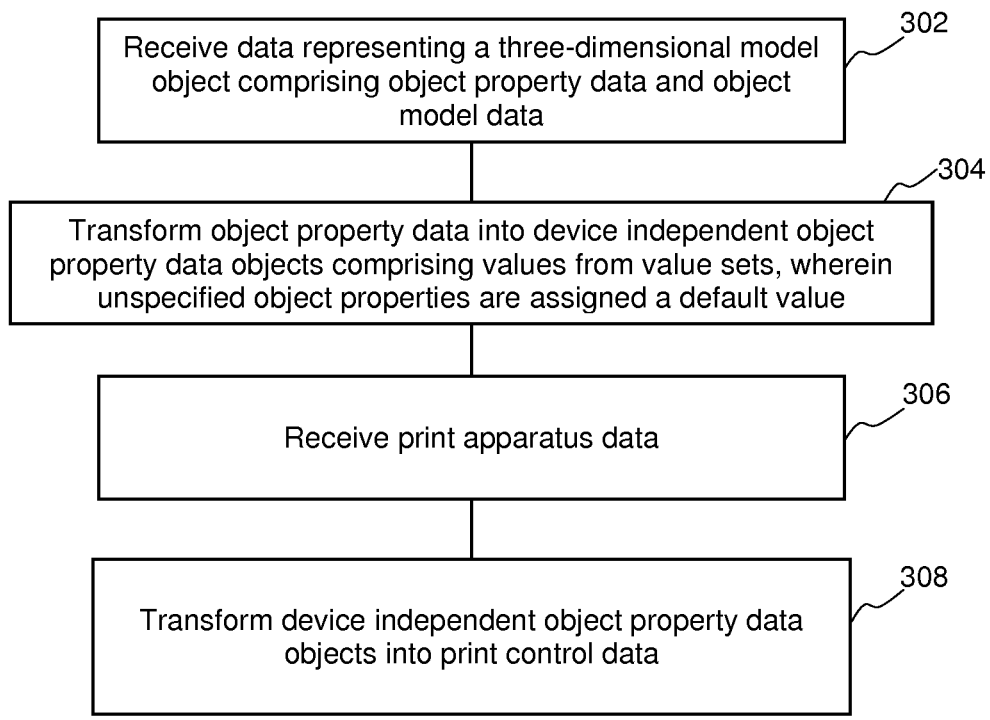
FIG. 3 is a flowchart of another example of a method comprising object property data transformation.

A further example is discussed in relation to the flow chart of FIG. 3. In this example, in block 302, data representing a three dimensional object is received. The data comprises object property data indicative of attributes of at least a portion of the three dimensional object and object model data defining the geometry of the three dimensional object.

In bock 304, the object property data is transformed into device independent object property data objects in which each value is a value from a value set which is predetermined for each object property and unspecified object properties are assigned a default value. In block 306, print apparatus data, which is indicative of the capabilities of a particular print apparatus is received. In block 308, the set of object property data objects is transformed into print control data is based on the print apparatus data.

For example, a particular print apparatus may allow for density control while other properties are fixed, whereas another may allow for color control, yet another for density and conductivity control, and so on. In some examples, in order to acquire print apparatus data, a print apparatus may be queried and asked to return its capabilities. In other examples, this data may be predetermined, and/or retrieved from a memory, held in a look up table, or the like. In other examples, the print apparatus may itself carry out the processing.

Figure 4:
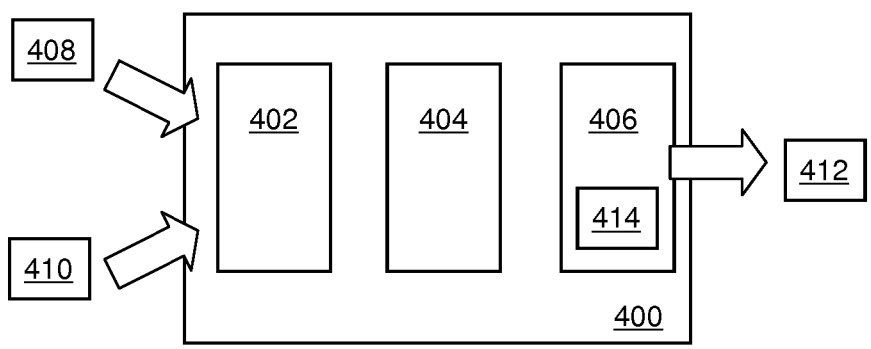
FIG. 4 is a simplified schematic of an example of processing apparatus for generating control data for production of a three dimensional object.

FIG. 4 shows an example of processing apparatus 400, comprising an interface 402, a mapping module 404 and a control data module 406.

The interface 402 receives model data 408 and print apparatus capability data 410. In this example, the model data 408 represents at least part of a three dimensional model object, and comprises a plurality of object property data objects. Each data object has a common data object structure (for example, a data structure such as shown in the data object 200 of FIG. 2) and represents a location in a three dimensional object. Each data object comprise a plurality of property values defining a predetermined set of properties of the three dimensional object at that location.

In some examples, the properties defined by each data value may be explicitly defined. In other examples, they may be identified or determined by consideration of the data form or content. For example, the mapping module 402 may identify the properties specified by values of a data object based on at least one of the resolution to which the value is specified and the frequency with which a value with a given resolution is contained within the data object. For example, an otherwise unspecified 3-channel 8-bit data portion of the data object may be interpreted as RGB data by default. If there is a single channel data with a particular bit depth, this may be taken as the density value and, in the absence of any specification, the density values therein may be interpreted to match the range of densities the print apparatus is capable of providing (such that a stated value of 0 maps to the minimum achievable density, etc). Other defaults may be predetermined in a similar manner. This allows for the processing of even an ambiguously defined input, which may provide an alternative to aborting the processing operation if incompletely specified inputs are received.

The mapping module 404 in this example maps at least one received object property data object to a print material coverage specification according to the print apparatus capability data. Such mapping may be carried out in relation to a rasterized representation of the model object. In some examples, this representation may comprise a plurality of planes, each rasterized into discrete locations. In some examples, the locations within the planes are binary: an object either exists at a location and has associated properties, or it does not.

In some examples, at least one value of a data object is mapped to a print material coverage specification based on the maximum and minimum values of that property achievable by the print apparatus, and/or the maximum and minimum values of the property within the object property data objects. As noted above, it may be that a scale or unit is not specified for a particular property (which may be all the properties) and in such examples, a value provided in the data object may be taken as an indication of a point on a scale from 0-100%, or some other range, which may be user specifiable. The 100% point may be the maximum value that a particular property can have for a particular property (e.g. the strongest red which can be produced, or the most dense construction, etc.). The 0% point may be the minimum value, which may represent that the property is absent (for example, no conductive agents, or no color is to be used), or may indicate that the value is to have to the lowest possible value (for example, density is at the minimum value). Within the data object, the maximum value may be the maximum value seen in a particular set of data objects (this may result in the property being more diversely represented in the printed object), or the maximum value given the range (for example, the bit depth).

In some examples, the interpretation of the data objects is determined or controlled by a user, who may chose to restrict the print apparatus capabilities in relation to a particular property and/or printing operation. In other examples, the range of at least one property may be restricted or specified by a maximum and/or minimum provided with the set of data objects. In other examples, as noted above, an absolute value (for example in standardised units) may be associated with any or each of the values in a value set for a particular property.

In summary therefore, in some examples, the interpretation of a data value may depend on any, or any combination of: a stated value range, the range of data values within a set of data objects, additional information concerning a relationship between an absolute value and a value in the data object, the print apparatus capabilities, user specification, default values.

The data objects may be mapped to Material volume coverage (Mvoc) vectors. An Mvoc vector may have a plurality of values, wherein each value defines a proportion for each, or each combination of print materials in an addressable location of a layer of the three dimensional object. For example, in an additive manufacturing system with two available print materials (for example, agents)—M1 and M2, where each print material may be independently deposited in an addressable area of a layer of the three dimensional object, there may be $2^2$ (i.e. four) proportions in a given Mvoc vector: a first proportion for M1 without M2; a second proportion for M2 without M1; a third proportion for an over-deposit (i.e. a combination) of M1 and M2, e.g. M2 deposited over M1 or vice versa; and a fourth proportion for an absence of both M1 and M2. In this case an Mvoc vector for a rasterized layer within a model may be: [M1, M2, M1M2, Z] or with example values [0.2, 0.2, 0.5, 0.1]—i.e. in a given addressable location in a layer, there is a 20% probability of M1 being applied without M2, 20% probability of M2 without M1, 50% probability of M1 and M2 and 10% probability that the location is empty. As each value is a proportion and the set of values represent the available material combinations, the set of values in each vector sum to 1 or 100%.

For example, in a case where the agents are colored, then the Mvoc vector may be determined to select agent combinations that generate a match with a supplied object property values, e.g. the supplied RGB values in an object property data object. In examples, such mappings may be held in a lookup table or the like.

The print apparatus capability data 410 in this example comprises an indication of at least one available print material. In other examples, it may comprise an indication of the print resolution, i.e. the level of detail with which object geometry and/or local object properties may be reproduced. In other examples, the print apparatus capability data 410 may comprise an indication of the range of values available for at least one object property. For example it may be that on a particular print apparatus, it is not possible to vary a particular parameter such that particular properties such as color, conductivity or density, but other properties may be varied. As such, the print material coverage specification may represent properties which are achievable by the print apparatus, which may be different from those specified in the device independent data objects.

The control data module 406 is to generate control data 412 from the print material coverage specification, the control data 412 being for the production of a three dimensional object. In this example, the control data module 406 comprises a halftone module 414 to provide halftoning data.

In this example, the halftone data comprises an array of threshold values. In one example, the threshold values are for carrying out a halftone operation that compares a value of the threshold matrix against a value indicative of a print material (such as an agent(s) or agent combination) probability distribution, which in this example is expressed as an Mvoc vector. This chooses a single 'state' (one of the possible materials or material combinations) based on the threshold value. Such halftone thresholds may be determined according to halftoning techniques such as void-and-cluster matrices, error diffusion techniques, dither based techniques, AM-screens, cluster-dot type patterns etc.

In a particular example, the model data comprises a three dimensional model object comprising an array of voxels representing a three dimensional model object, each voxel being located at a unique three dimensional location. The voxels may be of the same size and/or form, or may vary in size and/or form. Each voxel is associated with a device independent object property data object specifying the object properties for that voxel. The control data module 406 determines, for each voxel, from print apparatus capabilities indicating the available print materials and, in some examples, the resolution with which the print materials may be applied by the print apparatus, a combination of print materials to represent the property values. Each voxel representing the three dimensional model object is then mapped to a print material coverage specification, which specifies print materials as proportions of a set of available print materials at a location. The print material coverage specification may be used to generate control data as outlined above.

In some examples, if a print apparatus cannot provide a particular property, or a particular property combination, an alert may be generated and for example displayed or otherwise relayed to a user. In some examples, a processing or printing operation may be aborted.

Figure 5:
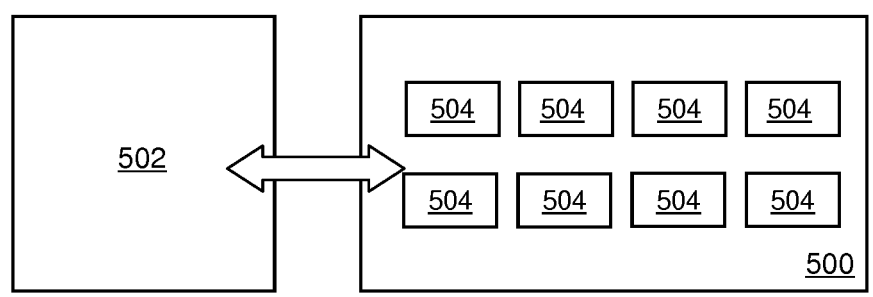
FIG. 5 is an example of an apparatus for storing and processing data representing a three dimensional object.

FIG. 5 shows a memory 500 associated with a processor 502. The memory is a computer readable medium for storing data for access by an application program being executed by the processor 502 and comprises a data structure including information for use by the application program. The data structure comprises a plurality of data objects 504. Each data object 504 has a common data object structure and represents a set of physical properties of a three dimensional object, wherein each physical property is specified as one of a predetermined set of values. Each value may comprise either a default value or an assigned value (wherein the assigned value may be assigned based on object property data). In one example, the object properties comprise: at least one color, and at least one of stiffness, opacity, conductivity and density. In some examples the data objects 504 may have a data structure having any of the properties described above in relation to FIG. 2. In some examples, each data object 504 is associated with a location within the three dimensional object.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, such the processing apparatus 400 or the processor 502, may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. In particular, a feature or block from one example may be combined with or substituted by a feature/block of another example The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving data representing a three dimensional object, the data to be used by an unspecified print apparatus in generating the object, the data comprising object model data defining the geometry of the three dimensional object and object property data indicative of at least one attribute of at least a portion of the three dimensional object; and,
   without transforming the object model data defining the geometry of the three dimensional object, transforming the object property data into a plurality of device independent object property data objects having a common data structure, each object property data object representing a set of object properties where each property is specified as one of a predetermined set of values; and,
   determining using a mapping module, each value as being either a default value or an assigned value based on at least one of a resolution to which the value is specified in an object property data object and the frequency with which a value with a given resolution is contained within an object property data object.

2. A method according to claim 1, in which each value is a value from a value set which is predetermined for each object property.

3. A method according to claim 1 comprising, if no indication of a property of the property set is provided in the received data for at least a portion of the three dimensional object, setting a value for that property in an object property data object to a default value.

4. A method according to claim 1 in which the received data representing the three dimensional object further comprises object model data defining the geometry of the three dimensional object.

5. A method according to claim 1 which further comprises transforming the plurality of device independent object property data objects into print control data.

6. A method according to claim 5, which further comprises receiving print apparatus data indicative of the capabilities of a print apparatus, and wherein transforming the plurality of device independent object property data objects into print control data is based on the print apparatus data.

7. Processing apparatus, comprising:
   a computer readable storage medium storing an interface that comprises instructions executable by a processor to cause the processing apparatus to receive model data and print apparatus capability data, the model data representing at least a portion of a three dimensional object and comprising a plurality of device independent object property data objects, each object property data object having a common data object structure and representing a location in a three dimensional object, wherein each object property data object comprises a plurality of property values defining a predetermined set of properties of the three dimensional object at that location;
   a computer readable storage medium storing a mapping module that comprises instructions executable by a processor to cause the processing apparatus to map each object property data object to a print material coverage specification according to the print apparatus capability data, and to determine each of the property values as being either a default value or an assigned value based on at least one of a resolution to which the property value is specified in an object property data object and the frequency with which a value with a given resolution is contained within an object property data object.

8. Processing apparatus according to claim 7 in which the print apparatus capability data comprises an indication of at least one of an available print material and a resolution with which a print material may be applied by the print apparatus, and the print material coverage specification is determined so as to provide an achievable representation of at least one value specified in the object property data object.

9. Processing apparatus according to claim 7 in which at least one value of an object property data object is mapped to a print material coverage specification based on the maximum and minimum values of that property achievable by the print apparatus, and the maximum and minimum values of the property within the received object property data objects.

10. Processing apparatus according to claim 7 in which the mapping module further comprises instructions executable by a processor to cause the processing apparatus to identify the properties specified by values of an object property data object based on at least one of the resolution to which the value is specified and the frequency with which a value with a given resolution is contained within the object property data object.

11. Processing apparatus according to claim 7 further comprising a computer readable storage medium storing a control data module that comprises instructions executable by a processor to cause the processing apparatus to generate control data from the print material coverage specification, the control data being for the production of a three dimensional object.

12. Processing apparatus according to claim 7 in which:
the model data comprises a three dimensional model object comprising an array of voxels representing a three dimensional object, each voxel being located at a unique three dimensional location and being associated with an object property data object; and
the print capability data comprises data indicative of at least one available print material of a print apparatus;
wherein the mapping module further comprises instructions executable by a processor to cause the processing apparatus to determine, for each voxel, a combination of print materials to represent the values within the object property data object for that voxel; and to map each voxel to a print material coverage specification, the print material coverage specification specifying print materials as proportions of a set of available print materials.

13. A non-transitory computer readable medium storing data for access by an application program being executed by a processor, comprising:
a mapping module stored in said computer readable medium for use by the application program;
a data structure stored in said computer readable medium, said data structure including information representing a geometry and physical properties of a three dimensional object for use by the application program, the data structure comprising:
object model data defining the geometry of the three dimensional object;
a plurality of apparatus independent data objects, each data object having a common data object structure and representing a set of physical properties of the three dimensional object, wherein each physical property is specified as one of a predetermined set of values, and wherein the mapping module determines each of the values as being either a default value or an assigned value based on at least one of a resolution to which the value is specified in a data and the frequency with which a value with a given resolution is contained within a data object; and,
for each data object, control data for a particular three dimensional print apparatus, wherein the mapping module generates the control data by a mapping from the data object based on print apparatus data received indicating capabilities of the particular three dimensional print apparatus.

14. A non-transitory computer readable medium according to claim 13 in which the object properties comprise: at least one color, and at least one of stiffness, opacity, conductivity and density.

15. A non-transitory computer readable medium according to claim 13 in which each data object is associated with a location within the three dimensional object.

* * * * *